United States Patent [19]
Osofsky

[11] 3,817,096
[45] June 18, 1974

[54] BALLISTIC RANGE DUST EROSION APPARATUS

[75] Inventor: Irving B. Osofsky, Palos Verdes Peninsula, Calif.

[73] Assignee: McDonnell Douglas Corporation, Santa Monica, Calif.

[22] Filed: Apr. 24, 1972

[21] Appl. No.: 246,546

[52] U.S. Cl. ........................................ 73/167, 73/7
[51] Int. Cl. .............................................. G01n 3/56
[58] Field of Search ............ 73/167, 86, 7; 222/199

[56] References Cited
UNITED STATES PATENTS

| | | | |
|---|---|---|---|
| 3,606,964 | 9/1971 | Ensinger | 222/199 X |
| 3,678,745 | 7/1972 | Teng | 73/167 |

*Primary Examiner*—Richard C. Queisser
*Assistant Examiner*—Joseph W. Roskos
*Attorney, Agent, or Firm*—Robert O. Richardson; Walter J. Jason; Donald L. Royer

[57] ABSTRACT

Ballistic range dust erosion testing apparatus wherein a saboted test specimen is fired through a calibrated test environment and then captured intact in a deceleration tube for the extraction of dust erosion data. A dust dispenser consists of a vertical hopper with a sliding, reciprocating gate valve having a stationary plate and a sliding plate with coincident holes aligned for metered dust dispersion during reciprocal movement of the sliding plate. Adjustment of moving plate stroke length and frequency (RPM) in combination with phase adjustment with the stationary plate provides a desired dust orientation in space through which the test specimen passes. Controllable vibration in three orthogonal planes applied to the dispenser sweeps the dust grid in space so that the entire area of the target is subjected to a uniform dust impingement, even in a vacuum. Data is obtained by microscopic examination as well as by weighing the eroded specimen.

8 Claims, 6 Drawing Figures

PATENTED JUN 18 1974 3,817,096
SHEET 1 OF 3
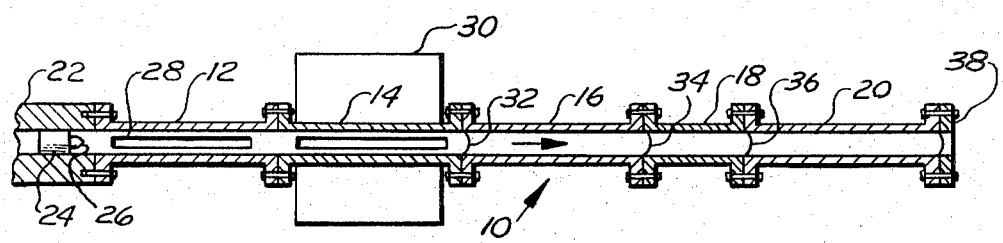
FIG_1
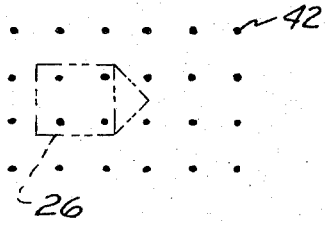
FIG_4
FIG_5   FIG_6

BALLISTIC RANGE DUST EROSION APPARATUS

CROSS-REFERENCE TO RELATED APPLICATIONS

U.S. Pat. application No. 88,879 filed Nov. 12, 1970 and now U.S. Pat. No. 3,678,745 for *Ballistic Compression Decelerator* by Robert N. Teng and assigned to a common assignee relates to the deceleration tube portion of the present invention.

BACKGROUND OF THE PRESENT INVENTION

There are conventional methods by which the study of erosion of missile nose cones and other leading edges in hypervelocity flight through dust, rain or ice environment may be made. In one, a stationary model is placed in a wind tunnel or a ballistic range and particles are accelerated by arc jet, light-gas gun or nozzle flow to impinge upon it. However, this method suffers from incomplete and uncontrolled simulation of the important aerothermodynamic parameters. In a second method, the specimen is photographed in flight through a ballistic range before it is destroyed at the projectory terminus. In this method, the measurement of erosion and of secondary effects is grossly inaccurate. In a third method, the specimens are mounted on a rail-guided rocket sled which is recovered after traveling through a test environment. This method is expensive to operate and also lacks the desired velocity, dust field, and temperature control.

SUMMARY OF THE PRESENT INVENTION

The present invention permits duplication of all actual flight conditions of interest to a vehicle designer and yet permits detailed examination of the undamaged test specimen after recovery since the projectile is recovered intact after its flight through the test environment. In particular, the test specimen is exposed to the effects of the environment, i.e., erosion by dust, rain or ice, after which the projectile enters a shock deceleration tube which permits its recovery without damage. The dust erosion data is obtained by weighing the recaptured test specimen and microscopic examination instead of using the conventional photographic method.

A dust hopper and dispenser is provided for placing a dust cloud in the path of the test specimen in order to subject it to an erosion environment. The particles in this dust cloud are of a predetermined size and must be of a specified vertical and horizontal spacing at the time of specimen passage. The dispenser has a reciprocating perforated metering plate with holes matching those of a stationary dispensing plate which forms the base of the hopper. The length of stroke and the RPM of the reciprocating plate are adjustable to provide the desired dust cloud pattern.

The stationary plate location relative to the moving plate, i.e., phase, can be changed by means of an adjustable screw to compensate for various different sizes of dust used in a test and to control the number of particles to be released per hole per cycle.

This grid of dust is uniformly vibrated so that the face of the projectile is uniformly covered with impacts. This vibration is controllably obtained in three orthogonal planes by use of two variable speed electric motors with eccentric flywheels whose axes are parallel to the metering plate.

BRIEF DESCRIPTION OF THE DRAWINGS

FIG. 1 is a vertical sectional view of the deceleration apparatus at the termination end of the range;

FIG. 3 is a perspective view showing the placement of the adjustment screw, vibrating motors and drive motor; and FIGS. 4, 5 and 6 are orthogonal views of the dust field at a given time.

DETAILED DESCRIPTION OF ILLUSTRATIVE EMBODIMENT

Figure 2:
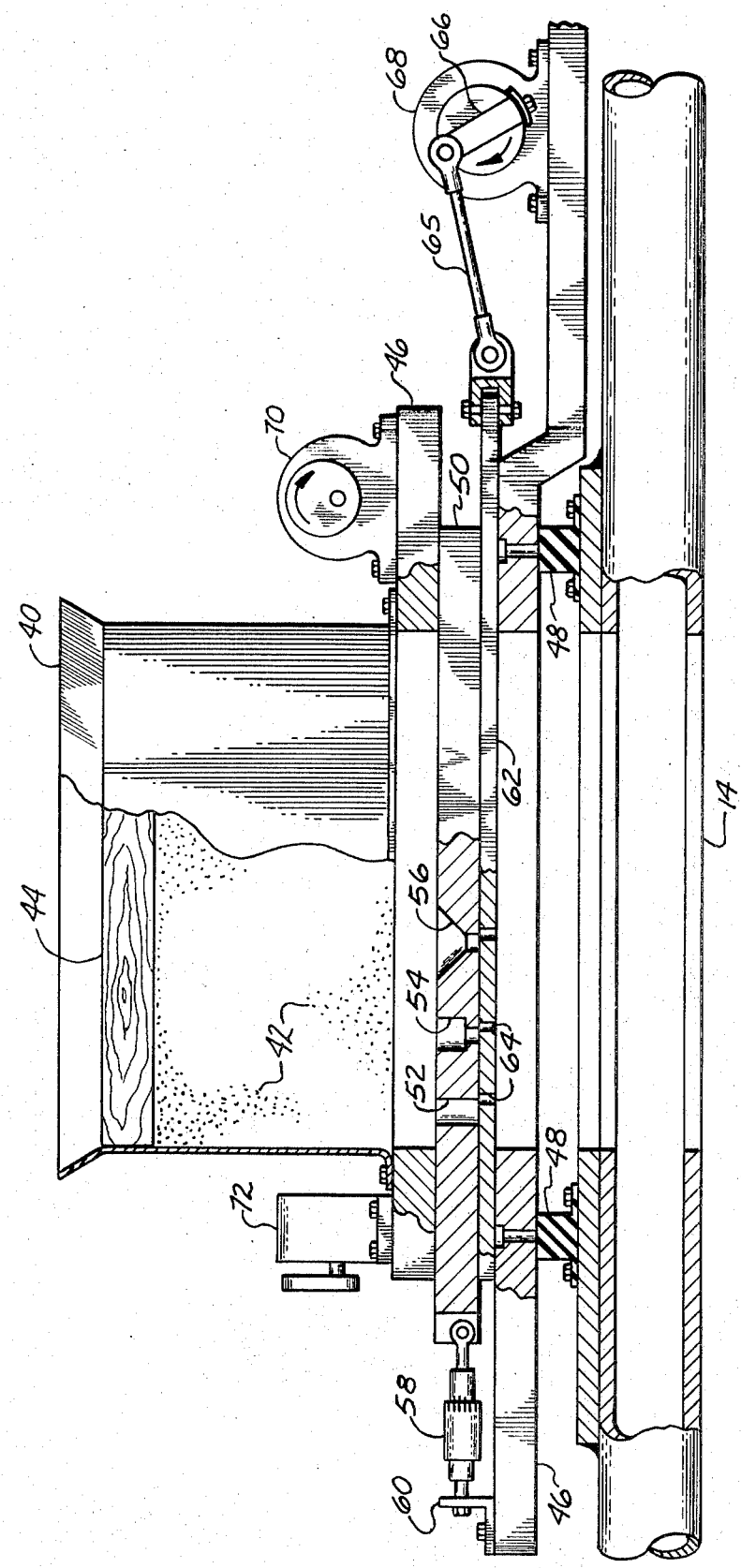
FIG. 2 is a longitudinal elevational view of the dispenser within the environmental chamber.
Figure 7:
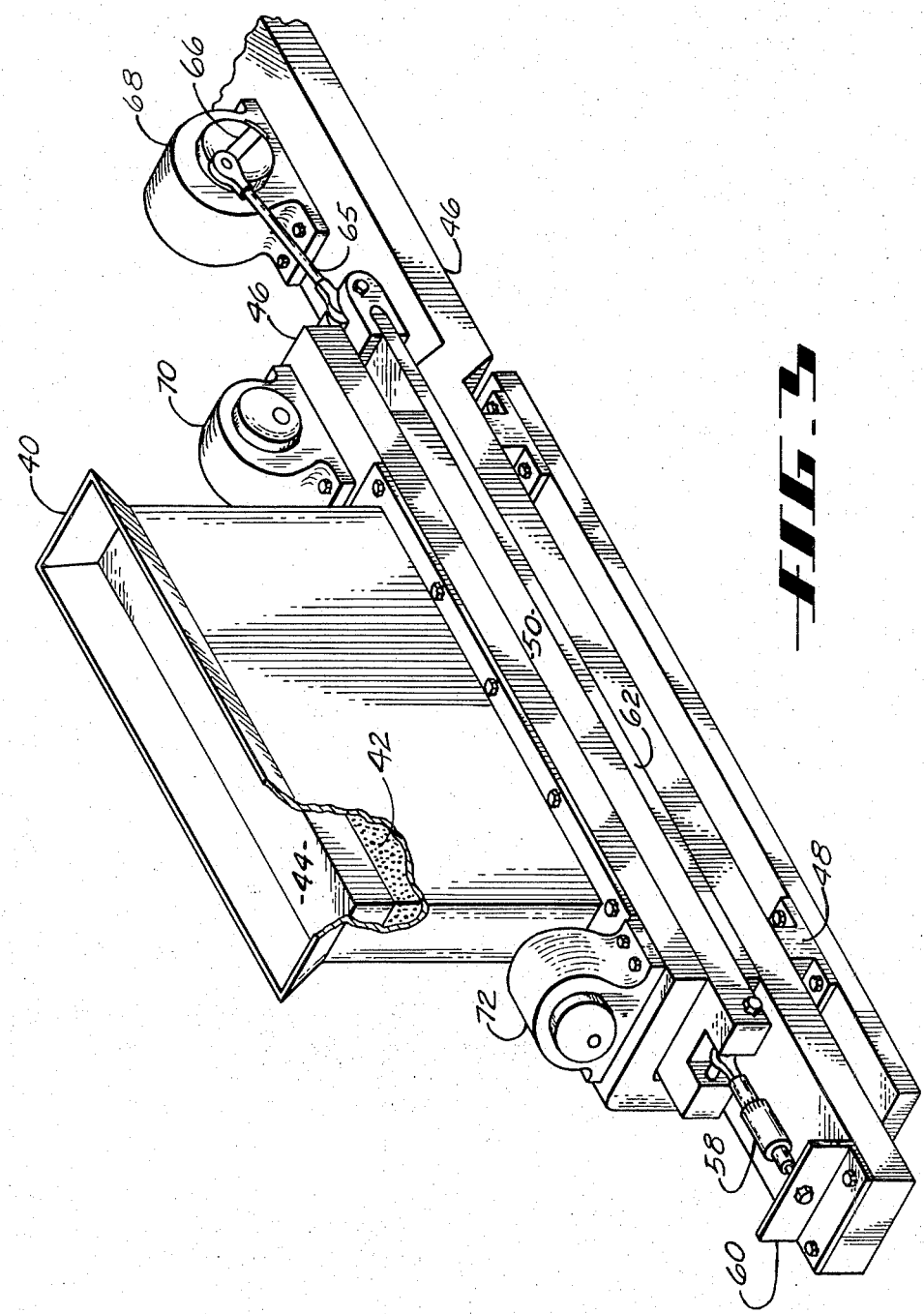

Referring now to FIG. 1 there is shown a ballistic compression decelerator 10 consisting of a plurality of tubes 12, 14, 16, 18 and 20. These tubes are interconnected in alignment to provide a projectile path extension from ballistic muzzle 22 from which a sabot 24 with a test specimen projectile 26 thereon is fired. Each of these tubes is about 20 feet long and has an internal diameter of about 1 5/8 inch. The test specimen 26 is of smaller diameter, such as one inch, for example, so as not to engage and be damaged by the inner walls of the deceleration tubes. Details of construction and operation of the projectile launching structure to which the ballistic compression decelerator 10 are attached are not herewith shown and described, since such is well known and it is not the starting of the projectile but the subjecting of it to a particular environment and then stopping it that is the concern of the present invention. It is herein sufficient to say that the projectile 26 has a velocity of up to 30,000 feet per second upon leaving muzzle 22.

Tube 12 has a plurality of vents 28 to prevent compression of gases in front of the sabot and slows down before passing through the environmental chamber. These vents 28 also relieve the launching gases in order for the projectile to assume a near constant free-flight velocity when it continues through the test environment chamber 30, over tube 14, where the test specimen 26 is exposed to the affects of the environment (e.g., erosion by rain or dust). Details of the test environment chamber 30 will be more fully described hereinafter.

Diaphragms 32, 34, 36 and 38 extend across the openings of the tubes at the points of interconnection and serve as a barrier so that the gas between the oncoming projectile and the diaphragm may be compressed. This compression causes the absorption of kinetic energy, causing the projectile 24 to slow down. The diaphragms preferably are made of a Mylar composition and are of a paper-thin thickness on the order of 0.005 inch thick. The term "Mylar" as used herein is the trademark of E. I. duPont deNemours & Company, Inc., and refers to the polyethylene terephthalate material manufactured by them. The temperature is proportional to the velocity to the projecticle for the particular gas medium used. For example, at a velocity of 10,000 feet per second, the heat caused by compression, if the gas is air, would be 6,000°F. whereas for hydrogen, the temperature would be 2,000°F. During the supersonic phase of projectile flight, a shock precedes the advancing projectile and commences to compress the air or other gas, such as hydrogen or helium, in the decelerator tubes 16 or 18, just in front of the projectile. The pressure within the tube in front of the shock wave may be 20 p.s.i. whereas the pressure behind the shock wave may be as high as 200 p.s.i. so that when the shock wave reaches the diaphragm, it will cause the diaphragm to burst before the sabot 24 and test specimen projectile 26 reaches it. As the projectile 26 slows down, the pressure in front of it also decreases.

As the projectile proceeds down its path into tube 18 and tube 20, it slows to a sonic or subsonic velocity. These tubes, 18 and 20, are second-stage shock decelerators which are precharged to a higher pressure than that of the low pressure shock decelerator tube 16. As the missile continues at a subsonic velocity, the pressure is built up in each tube until it causes the associated diaphragm to rupture at some optimum predetermined pressure. The use and quantity of diaphragms depend on the gases employed in the decelerator tubes and the length of the tubes, as well as the free-flight velocity of the test specimen. Any number of tubes and their length may be used so that the projectile will continue along its free-flight path until it is slowed to a standstill. A final diaphragm 38 may or may not break depending upon the adiabatic pressure buildup. If the diaphragm 38 does break, a plastic foam catcher, not shown, will capture the projectile unharmed.

Reference is now made to the particle dispenser apparatus shown in FIG. 2. Here there is shown a hopper 40 into which a quantity of particles 42 such as dust, sand, glass microballoons, etc., are stored for use. A weight 44 at the top prevents pockets from forming as the particles are dispensed. The hopper 40 is on a frame 46 which rests on resilient mountings 48 positioned on test tube 14. Within the frame 46 and serving as the base of the hopper is a stationary dispensing plate 50 having a plurality of holes 52 in it to permit exit of the particles 42. These holes may be counterbored, as shown by hole 54, or countersunk, as shown by hole 56. A micrometer phase adjustment screw 58 connected between plate 50 and a bracket 60 on frame 46 is provided to permit lateral movement of plate 50 for adjustment for the various sizes of particles 42 used in various tests. A reciprocating metering plate 62 is positioned adjacent dispenser plate 50 and has holes 64 which will align with the holes in plate 50 at one position of plate 62 in its stroke path. This metering plate 62 is connected to an adjustable eccentric arm 66 on motor 68 having an adjustable RPM. In this manner the length and frequency of stroke of reciprocation of plate 62 can be regulated to control the quantity of particle drop and the vertical spacing between successive particle drops through holes 64. Having the moving plate 62 below the stationary plate 50 instead of above it is not necessary but is preferable at high speed reciprocation to avoid air pockets when the holes fail to fill up with particles for the next stroke.

Vibrator 70 is mounted on frame 46 to vibrate it longitudinally and vertically. Another vibrator 72 on frame 46 vibrates it vertically and laterally. The amplitude and frequency of vibration is variable as desired. Thus, at any moment in time a three-dimensional grid pattern of particles is falling into the path of test specimen flight below, not shown in FIG. 2. At the next moment in time the next exit of particles from holes 64 will be slightly spaced in three directions. With proper adjustment the test specimen surface will be completely and uniformly impinged as it passes through the particle grid. The vibration moves the grid in space in a controlled manner for uniform diffusion of particles on the specimen to touch all areas.

A perspective view of the particle dispensing apparatus is shown in FIG. 3. Since the numerals identify like parts to those in FIG. 2, the assembly should now be obvious and further description is not believed to be necessary.

A plan view of the top layer of the particle pattern at a given moment is shown in FIG. 4. It shows the position of the particles 42 to be the same as the hole pattern in metering plate 62. The side view in FIG. 5 and end view in FIG. 6 show the vertical spacing of particles 42 resulting from successive strokes. However, with vibration the dispersion is not vertically aligned, as shown, but is offset slightly so that uniform dispersion on the specimen passing through it is achieved.

As the particles fall from the dispenser they accelerate due to the influence of gravity. Thus, the initial vertical spacing immediately below the dispenser is not uniform. Under the influence of gravity this spacing increases with time until the terminal velocity of the falling particles is reached, at which point it becomes uniform. Thus, the dispensing apparatus in chamber 30 in FIG. 1 is spaced above path 14 to allow a uniform downward velocity to develop. In the usage to date with the dust particles involved, this distance is about one foot.

While the foregoing dispenser was developed for the erosion testing of high velocity nose cones, the specimens of which were retrieved without destruction in a deceleration chamber, there are alternate uses such as in sprinkling sugar, flour or spices in the baking industry and in distributing grit, glue or ink pellets on articles moving along a conveyor below it.

Having thus described an illustrative embodiment of the present invention, it is to be understood that modifications thereof will become apparent to those skilled in the art and it is to be understood that these deviations are to be construed as part of the present invention.

I claim:

1. A particle dispersion apparatus comprising:
   a hopper for containing a plurality of particles,
   a dispensing plate forming the base of said hopper and having a plurality of holes therein,
   a reciprocating metering plate positioned adjacent said dispensing plate and having a matching plurality of holes therein,
   adjusting means for positioning the holes in said dispensing plate in predetermined initial phase relationship with the holes in said metering plate, and
   means for cyclically moving said metering plate relative to said dispensing plate to increase and decrease the area of alignment of said holes in said plates, thereby regulating the number of particles passing through the metering holes per cycle independently of the relation of particle size to size of the metering holes,
   means adapted to pass said article to be impinged by said particles under said plates at a predetermined velocity, and
   vibration means vibrating said apparatus at a predetermined frequency and amplitude in three orthogonal planes to provide a uniform pattern of impingement on said article.

2. A particle dispersion apparatus as in claim 1 wherein means are provided for adjusting the cyclical frequency and thereby adjust the vertical spacing of particles passing through said metering plate.

3. A particle dispersion apparatus as in claim 1 and means for adjusting the distance of movement of said metering plate to regulate the particle quantity passing through holes in said metering plate per stroke thereof.

4. A particle dispersion apparatus in combination with means for passing an article thereunder for impingement of particles therein upon said article, said particle dispersion apparatus comprising:
   a hopper for containing a plurality of particles,
   a dispensing plate forming the base of said hopper and having a plurality of holes therein,
   a reciprocating metering plate positioned adjacent said dispensing plate and having a matching plurality of holes therein,
   means for cyclically moving said metering plate relative to said dispensing plate a predetermined distance, and
   means for adjusting said distance thereby to regulate the particle quantity passing through holes in said metering plate per stroke thereof,
   said means passing said article under said plates for impingement by said particles being adapted to pass said article thereunder at a predetermined velocity.

5. A particle dispersion apparatus as in claim 4 wherein the stroke frequency is adjustable to provide a predetermined vertical spacing of particles passing through said metering plate.

6. A particle dispersion apparatus as in claim 4 including
   vibration means vibrating said apparatus at a predetermined frequency and amplitude in three orthogonal planes to provide a uniform pattern of impingement on said article.

7. A ballistic range particle erosion apparatus comprising:
   means for firing a test specimen down a ballistic range at a predetermined velocity,
   said range having an environmental chamber through which said specimen passes,
   a particle dispersion apparatus in said chamber including a hopper with a dispensing plate forming the base thereof,
   said dispensing plate having a plurality of holes therein,
   a reciprocating metering plate positioned adjacent said dispensing plate and having a matching plurality of holes therein,
   means moving said metering plate relative to said dispensing plate in distance and frequency to provide a predetermined three-dimensional grid pattern of particles through which said specimen passes, and means for nondestructably recovering said specimen for particle erosion examination thereof.

8. A ballistic range particle erosion apparatus as in claim 7 wherein said specimen passes through a plurality of deceleration chambers to reduce the speed thereof without destruction of particle impingement effects on said specimen.

* * * * *

PO-1050
(5/69)

UNITED STATES PATENT OFFICE
CERTIFICATE OF CORRECTION

Patent No. 3,817,096      Dated 18 June 1974

Inventor(s) Irving B. Osofsky

It is certified that error appears in the above-identified patent and that said Letters Patent are hereby corrected as shown below:

In Column 4, line 43, after "apparatus" insert the following: --for impingement of particles therein upon an article passing thereunder--

Signed and sealed this 22nd day of October 1974.

(SEAL)
Attest:

McCOY M. GIBSON JR.
Attesting Officer

C. MARSHALL DANN
Commissioner of Patents